United States Patent
Klein Swormink et al.

(10) Patent No.: US 9,554,446 B2
(45) Date of Patent: Jan. 24, 2017

(54) CALIBRATION OPERATION OF A LIGHTING DEVICE

(71) Applicant: KONINKLIJKE PHILIPS N.V., Eindhoven (NL)

(72) Inventors: Michel Albertus Theodorus Klein Swormink, Eindhoven (NL); Michiel Adriaanszoon Klompenhouwer, Waalre (NL); Marek Zbigniew Szczerba, Eindhoven (NA); Jurgen Mario Vangeel, Beerse (BE); Roger Peter Anna Delnoij, Lommel (BE); Johannes Martinus Maria Hensing, Veldhoven (NL); Petrus Antonius Verbeek, Deurne (NL); Johannes Jozef Wilhelmus Kalfs, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/785,368

(22) PCT Filed: Apr. 10, 2014

(86) PCT No.: PCT/EP2014/057229
§ 371 (c)(1),
(2) Date: Oct. 19, 2015

(87) PCT Pub. No.: WO2014/170193
PCT Pub. Date: Oct. 23, 2014

(65) Prior Publication Data
US 2016/0073475 A1      Mar. 10, 2016

(30) Foreign Application Priority Data

Apr. 19, 2013   (EP) .................................. 13164410

(51) Int. Cl.
H05B 39/04     (2006.01)
H05B 37/02     (2006.01)

(52) U.S. Cl.
CPC ...... *H05B 37/0218* (2013.01); *H05B 37/0227* (2013.01); *H05B 37/0272* (2013.01); *Y02B 20/44* (2013.01); *Y02B 20/46* (2013.01)

(58) Field of Classification Search
None
See application file for complete search history.

(56) References Cited

U.S. PATENT DOCUMENTS 5,701,058 A * 12/1997 Roth .................. H05B 37/0218
                                                    250/214 D
7,781,713 B2   8/2010 Papamichael et al.
(Continued)

FOREIGN PATENT DOCUMENTS

WO            9960804 A1     11/1999

*Primary Examiner* — Dedei K Hammond

(57) ABSTRACT

A controller comprising: presence detection logic, calibration logic, and an input for receiving a reading from a light sensor representing a sensed light level. The presence detection logic is for detecting presence events based on a presence sensor, and is configured to indicate a set-point to operate at least one lighting device in dependence on a positive detection of presence. The calibration logic is for performing a calibration operation, which is performed by causing a light output of the lighting device to change between a first, lower level and a second, higher level, and by and calibrating the set-point based on the reading from the light sensor under influence of the first and second levels. The calibration logic is configured to trigger this calibration operation in response to the positive detection of presence.

15 Claims, 4 Drawing Sheets

(56) References Cited

U.S. PATENT DOCUMENTS

| | | | |
|---|---|---|---|
| 8,536,505 B2 * | 9/2013 | Page | ................ H05B 37/0218 250/205 |
| 2010/0045191 A1 * | 2/2010 | Aendekerk | ............ G05D 25/02 315/152 |
| 2011/0221350 A1 | 9/2011 | Staab | |
| 2012/0025717 A1 | 2/2012 | Klusmann et al. | |

\* cited by examiner

CALIBRATION OPERATION OF A LIGHTING DEVICE

CROSS-REFERENCE TO PRIOR APPLICATIONS

This application is the U.S. National Phase application under 35 U.S.C. §371 of International Application No. PCT/EP2014/057229, filed on Apr. 10, 2014, which claims the benefit of European Patent Application No. EP 13164410.6, filed on Apr. 19, 2013. These applications are hereby incorporated by reference herein.

TECHNICAL FIELD

The present disclosure relates to calibrating the operation of a lighting device based on reading from a light sensor, for example a lighting device whose light output is to be regulated based on subsequent readings from the light sensor.

BACKGROUND

In lighting systems and in society as a whole, there is a trend towards sustainable solutions. One way to achieve more sustainable systems is to reduce energy consumption. In lighting systems this is often done by making use of sensors. One possibility is to make use of presence sensors, so as only to switch on the lights when a person is present. Another possibility is to make use of daylight harvesting. When enough light is available in a room from daylight, the lights inside are dimmed to reduce the energy consumption. It is also possible to implement systems that include both presence detection and daylight harvesting.

One issue with daylight harvesting systems is the need for calibration. For example in daylight harvesting systems, a light sensor may be located on the ceiling. This light sensor measures an overall light level which comprises both light from the window and light from the electrical lights inside, e.g. as reflected from a work surface such as a desk. A control loop varies the amount of artificial light emitted so that the total sensor reading meets a desired set-point, to thereby keep the overall amount of light at the desired level. This means a calibrated set-point will have to be defined, i.e. to define what sensor reading corresponds to the desired light level. Calibration may also be an issue in other situations.

In current practices, calibration is performed by a commissioning engineer using another, already-calibrated light sensor. He or she controls the amount of light and by dimming up and down, and makes sure that typical 500 lux fall on the desk. This calibration step is time consuming and therefore expensive.

U.S. Pat. No. 7,781,713 (Papamichael et al) discloses an automatic calibration process, in which calibration is performed by controlling the light output to automatically cycle through different energy levels, and measuring the difference in the light sensor measurement experienced under the different levels.

SUMMARY

However, it is believed there is scope for improving on or providing an alternative to Papamichael's system. For example, the inventors believe it may not in fact be desirable to calibrate by cycling through power levels in the way Papamichael describes. For one thing, this may lead to unexpected luminaire behavior from perspective of the end-user (e.g. the user is present during the cycle, or sees through a window that the lights are cycling strangely when a room is unoccupied). Instead, it may be preferable to perform calibration at the moment presence is detected, as the end-user expects a change in light output then anyway. So by choosing the moment a calibration is to be done, one can hide the light effects of the calibration from the end-user, leading to a better user experience.

Further, the power cycle required by Papamichael's technique is relatively complex and involves central coordination between luminaires. If instead the calibration is incorporated at the point when presence is detected and the luminaire will be transitioning from a lower to a higher level anyway (e.g. from fully off to a task level), this may enable the complexity required to implement the system to be reduced. For example, the luminaires could even become self-calibrating, requiring no coordination from a central controller for this purpose.

According to one aspect of the disclosure herein, there is provided a controller comprising: presence detection logic, calibration logic, and an input for receiving a reading from a light sensor representing a sensed light level. The presence detection logic is for detecting presence events based on a presence sensor, and is configured to generate a set-point to operate at least one lighting device in dependence on the presence events. The calibration logic is for performing a calibration operation, which is performed by causing a light output of the lighting device to change between a first, lower level and a second, higher level, and by and calibrating the set-point based on the reading from the light sensor under influence of the first and second levels. The calibration logic is configured to trigger this calibration operation in response to one of the detected presence events. Preferably the triggered calibration operation is completed before the light output of the device settles at the operative level.

This way the different light levels involved in the calibration can advantageously be incorporated as part of the transition from the no-presence level to the operative level, masking the effect from the user. For example, the lower level used for calibration may be completely off, the higher level used for calibration could be the lighting device's maximum output, and the operative level may be a task level or background level somewhere between the two. When no occupant is present the lighting is turned completely off, which is also used for the lower level of the calibration process. Upon presence being detected—e.g. a person enters a room—the lighting device is temporarily taken up to the maximum level, and the calibration is completed based on the sensor readings for the completely-off and maximum levels. The lighting device is then taken down to the task level or background level based on the now-calibrated set-point. For example task level could be 80% or background level could be 20%.

Note in embodiments, the reading from the light sensor under influence of the first, lower light level (but not the second, higher level) may optionally have already been taken upon triggering the calibration operation, e.g. while the light was turned off.

In embodiments, the calibration techniques disclosed herein may advantageously be used in a daylight harvesting. In this case, the sensed light level comprises a contribution from the at least one lighting device and a contribution due to ambient light; and the controller comprises light regulation logic configured to operate the lighting device based on said set-point and the reading from the light sensor. The light regulation logic thereby acts to maintain the sensor reading at a level corresponding to the set-point while a relative proportion of said contributions varies.

In further embodiments, using the detection of presence to trigger calibration may enable the calibration to be triggered autonomously at the luminaire or at individual luminaires, i.e. without needing a separate, central controller to coordinate the calibration. A system based on distributed presence detection may even be provided, whereby multiple luminaires are configured to communicate between one another to share presence detection results, e.g. by transmitting wirelessly between them. In this case a transmission indicating presence detected by one luminaire may trigger a calibration of another luminaire.

Hence according to another aspect disclosed herein, there may be provided a lighting system comprising a plurality of luminaires, each respective one of the luminaires comprising a respective controller, light sensor and presence sensor. Between them, the controllers are configured to perform operations of: detecting presence events at each of the respective luminaires based on the respective presence sensor; transmitting indications of the presence events between the luminaires; operating the luminaires to emit light in dependence on the presence events; and performing a respective calibration operation to calibrate each of the luminaires. Each respective calibration operation comprises causing a light output of the respective luminaire to change between a first, lower level and a second, higher level, and taking a reading from the respective light sensor under influence of the first and second levels. Each of the respective controllers is further operable to trigger the respective calibration operation in response to one of the presence events detected at the respective luminaire, and is operable to trigger the respective calibration operation in response to one of the indications of presence events being received from one or more other of the luminaires. This means then when one of the presence events is detected at a first of the luminaires, this triggers the respective calibration operations of the first luminaire and one or more of the other luminaires. The respective calibration operations are thereby triggered to be performed at least partially in parallel with one another.

According to another aspect, there is provided a computer program product for use in controlling at least one lighting device, the computer program product comprising code embodied on a computer readable storage medium and configured so as when executed to perform operations in accordance with any of the controller, luminaire or system features disclosed herein.

BRIEF DESCRIPTION OF THE DRAWINGS

For a better understanding of embodiments disclosed herein and to show how they may be put into effect, reference is made to the accompanying drawings in which.

DETAILED DESCRIPTION OF EMBODIMENTS

The following relates to the calibration of daylight harvesting systems. The conventional manual calibration involved in achieving the desired light levels is replaced by an auto-calibration which is triggered by presence. In an exemplary implementation of the auto-calibration, a group of distributed luminaires will perform an auto-calibration when the first presence is detected. The first luminaire to detect presence will send a group broadcast to all the luminaires in the group. In response, all luminaires will go to a defined output level and then the calibration is performed.

In embodiments, one or more of the following advantages may be achieved using auto-calibration triggered by presence.

The calibration is performed at the same time as an off-on transition of the light that is already associated with detecting presence, i.e. when a person is positively detected (or more generally this could be an upward transition of the light level when presence is detected). This way, the auto-calibration need not be disturbing to end-users (or at least relatively not so).

The technique also works for a distributed system. The off-on transition can be used by all luminaires in a lighting system group to do the calibration. In a distributed system the light level is achieved by multiple luminaires. To use the light output as a reference, all luminaires should preferably be either known or equal. This is less complex to implement with an off-on transition.

The system does not necessarily need to control the switching behavior. In contrast for example, if the system is behind a timer with a relay that switches the mains power, an on-off transition (as opposed to an off-on transition) may not be able to be measured as it also cuts the power of the sensor. In that case the system would not be able to calibrate.

The transition can be to a fixed level (e.g. 100%). In contrast, using an on-off transition the light output from with it switches to off depends on daylight, so the system does not switch between two fixed levels. Doing the calibration on different levels makes the calibration less reproducible. In an off-on transition on the other hand, it need not be annoying for the end user that the system switches first to a fixed level (e.g. 100%) before starting to dim to an operative level (e.g. task level at 80% or background level at 20%).

No characterization of dim levels need be necessary. In contrast, if the transition was not between fixed levels then the complete dim range would have to be characterized—common interfaces to a ballast (1-10V, DALI) do not have a precise linear dimming curve, so it may be necessary to characterize the dimming curve by doing multiple calibrations. These calibration steps at multiple dim levels are visible and would be annoying if observed by end-users.

Figure 1:
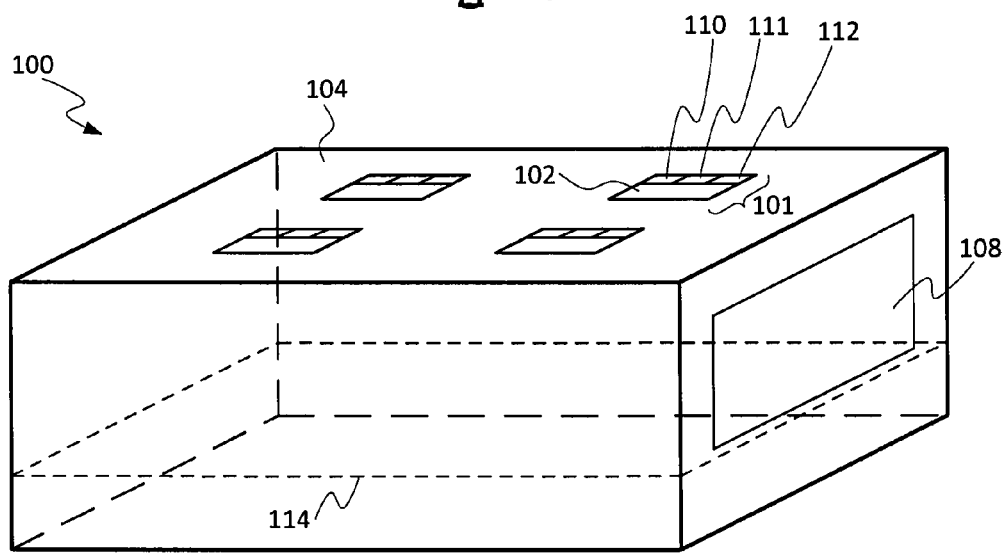
FIG. 1 is a schematic illustration of an environment comprising a lighting system.

FIG. 1 is a schematic representation of space 100 comprising an example lighting system according to one embodiment of the present invention. For example the space may comprise an interior space of a building such as an office, laboratory, shop floor or other room; or may comprise an outdoor space such as a garden, park or stadium; or a covered space such as a gazebo. The lighting system comprises one or more luminaires 101 which may take the form of integrated fixtures of the room or free-standing units. Each luminaire 101 comprises a respective lighting device 102 such as an LED (light emitting diode) or electric filament, along with any associated fixture or fitting. For example each luminaire 101 may be mounted on a ceiling 104 of the room 100, or wall. The lighting device 102 of each luminaire 101 is arranged to emit artificially generated light into the space 100. Further, the space 100 will tend to include some amount of ambient light, such as daylight or other natural light, at least at some times of day. For example if the space 100 is a room, it will typically comprise one or more openings such as a window 108, e.g. a window in a side wall of the room and/or a skylight. The window 108 admits other light into the room 100 from the exterior, principally natural light comprising daylight from the sun.

In the embodiment of FIG. 1, each luminaire 101 further comprises a respective light sensor 110, presence sensor 111 and controller 112 associated with each respective lighting device 102. The controller 112 is coupled to the respective lighting device 102, and the respective light sensor 110 and presence sensor are coupled to the controller 112. The light sensor 110 and/or presence sensor 111 may also be substantially co-located with the respective lighting device 102. The respective presence sensor 111 is arranged to sense presence of a being (typically a human user) in a region of the space illuminated by the respective lighting device 102. In embodiments the light sensor 110, presence sensor 111 and/or controller 112 are integrated into the same unit in the same housing as the lighting device 102, preferably all together to form an integrated luminaire 101 with at least partially autonomous control. A plurality of such individual luminaires 101 may be arranged together in the space 100 to provide a distributed lighting system that does not (necessarily) require a central controller, or at least not for all functionality. The system may this be arranged to dim the lights in a granular fashion, i.e. per individual luminaire. Further, the lights are controlled based on the detected presence.

Each controller 112 controls the light of its respective lighting device 102 based on its respective light sensor 110. To do this the controller 112 will have to be calibrated, so as to be able to control the light emitted from the device to provide a specified light level at a certain point or height within the room or other space 100, e.g. in a workspace plane 114 such as desk height. For example one recommendation for an office workspace is 500 Lux at desk height.

Figure 3:
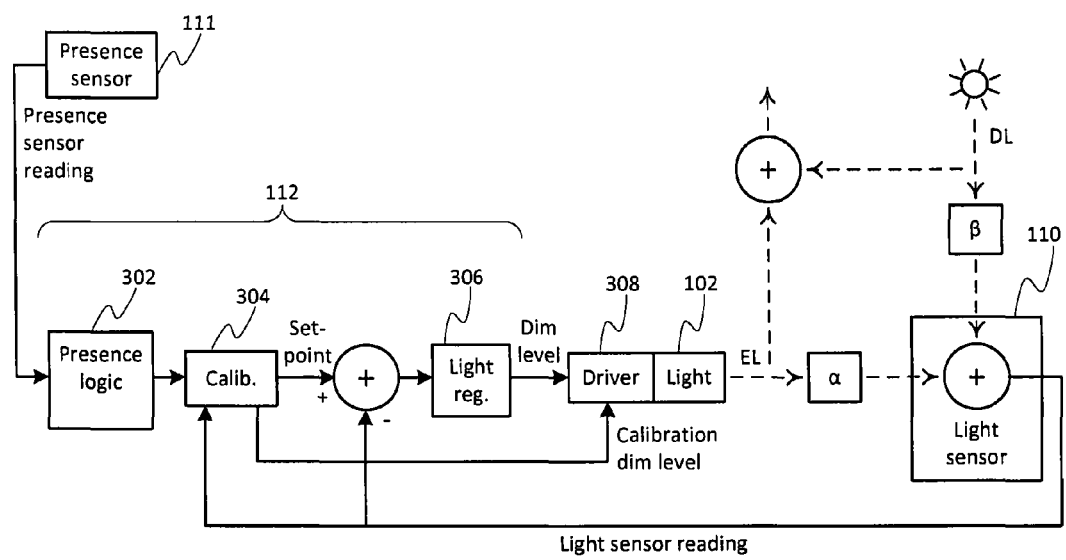
FIG. 3 is a schematic block diagram of a lighting system with presence detection and light regulation.

FIG. 3 is a schematic block diagram showing some of the components of FIG. 1. The controller 112 comprises presence detection logic 302, calibration logic 304, and light regulation logic 306. This logic 302, 304, 306 may be implemented as portions of code (software) stored on a memory in the form of one or more computer readable storage media, and arranged for execution on a processor comprising one or more processing units—for example, a respective instance of the controller 112 may be implemented in a respective memory and processor embedded in each respective luminaire 101, integrated into in the same housing. Alternatively it is not excluded that some or all of the logic 302, 304, 306 is implemented in dedicated hardware circuitry, or in configurable circuitry like an FPGA. Generally any combinations of software logic and hardware logic is possible, though a wholly or largely software based implementation may be preferred.

An output of the light sensor is coupled to an input of the light regulation logic 306, to receive its currently sensed reading. This is indicative of the total sensed amount of light arriving at the light sensor 110, for example the amount of light reflected from a work surface 114 such as a desk into the light sensor 110. An output of the light regulation logic 306 is coupled to a driver 308 of the respective lighting device 102, in order to supply a dim level to the driver and thereby control the lighting device 102 to be driven to output a specified level of light into the space 100. The driver 308 may sometimes also be referred to as a ballast. The reading from the light sensor 110 provides a feedback of the total amount of light sensed from the space 2. The light regulation logic 306 is also arranged to receive as an input a set-point value. The light regulation logic 306 acts to make the light sensor reading correspond to the set-point. For example, the light regulation logic 306 subtracts the light sensor reading from the set-point value and acts to make the difference between them equal to zero—if the current reading is greater than the set-point it controls the driver 308 to decrease the light output from the lighting device 102, and vice versa.

Together the light regulation logic 306, driver 308, lighting device 102 and light sensor 110 thus form a control loop for regulating the amount of light based on the amount of daylight (or other ambient light) in the space 2. The sensor reading represents the amount of reflected electric or artificial light (EL) as generated by the lighting device 102 plus the amount of reflected daylight or other ambient light (DL). If the reflection coefficients are denoted as α and β respectively, the sensor reading s may then be expressed by the formula:

$$s = \alpha EL + \beta DL$$

If the amount of daylight (or more generally ambient light) decreases, this decreases the amount of artificial light needed to make the sensor reading s match the desired set-point, and vice versa. So considering a small increase in the amount of daylight, the sensor reading goes up, the light regulation logic 306 senses an increase relative to the set-point, and in response the light regulation logic 306 dims down the artificial light 102; and conversely for a decrease in the amount of daylight.

The presence sensor 111 is coupled to the presence detection logic 302, and generates a signal representative of presence which it supplies to the presence detection logic 302. For example the presence sensor 111 may comprise an active sensor such as an ultrasonic sensor which sends out bursts of acoustic waves or other radiation (or indeed a continuous wave) and uses the echoes it receives back from the environment to determine whether there is presence in that environment. Different methods can be used for this, for example Doppler shift measurements, time-of-flight measurements, and/or moving target indicator (MTI) processing. The signal supplied by the presence sensor may thus represent an amount of motion and/or range or a being or object in the space 2, e.g. of a human occupant. An alternative technology is a passive sensor such as a passive infrared sensor which detects presence based on infrared emissions from a being. In the context of detecting a living being such as a human user, a presence sensor may also be referred to as an occupancy sensor. The presence detection 302 logic receives the signal output from the presence sensor and interprets this to determine whether a being appears to be present—a positive presence result. Of course the presence detection logic 302 cannot know the detected being is alive per se, but it is assumed the relevant quantity being detected is indicative of presence. For example a being may be deemed present if the signal representing the amount of motion, range and/or heat exceeds a threshold.

When the presence detection logic 302 detects a positive presence result based on the signal from its respective presence sensor 111 (e.g. a user has just entered the room) it generates an (uncalibrated) signal indicating a desired set-point at which the respective lighting device 102 is to be set. For example where presence is detected by the luminaire's own respective presence sensor 111 and logic 302, it may indicate that the light should be set to a task level, e.g.

80% or a value in the range 80%-90%. However, for this to be meaningful the set-point has to be calibrated by the calibration logic 304.

To this end, the presence detection logic 302 is coupled to the calibration logic 304, to supply it with the uncalibrated indication of the desired set-point, i.e. to indicate the specified light level. The calibration logic 304 is coupled to the light regulation logic 306, and is configured to translate the specified light level indicated by the presence detection logic 302 into a calibrated set-point which it supplies on to the light regulation logic 306. For the purpose of calibration, the calibration logic is coupled to the light sensor 110 to receive its currently sensed reading, and also to the driver 308 to be able to control the lighting device 102. To perform a calibration operation, the calibration logic 304 controls the lighting device 102 to output light at different levels, and takes corresponding light sensor readings as follows.

The light level calibration is used to compute the calibrated set-point for the sensor reading. The calibrated set-point represents the light level as measured by the light sensor 110 that corresponds to a desired amount of light from the lighting system, i.e. target for the sensor reading which the light regulation logic 306 will act to achieve by varying the artificial light output. The desired amount of light may be expressed as a fraction (for example a percentage, e.g. 80%) of the amount of light that is maximally generated by the lighting system. That is, the presence detection logic outputs an indication that it requires a certain light level, say 80% (it could output this figure explicitly or it could be implicit in an indication that, say, a task level is required). The calibration logic 304 then translates this into a target sensor reading, the set-point, which the light regulation logic 306 will aim for.

The actual set-point to be output to the light regulation logic 306 is calculated by taking a fraction of a reference set-point, where the reference set-point represents the sensor reading as if all lights were turned to maximum and there was no external light (dark room calibration'). The goal of the calibration procedure is to determine this reference.

However, it cannot be guaranteed that there is no external light during the calibration procedure, and therefore the calibration logic 304 works by determining the difference in light level readings between the lights being turned off and the lights being at their maximum level (or more generally between a lower and a higher level). Computing the calibrated set-point thus involves three steps. First, the light sensor value is read while the luminaire is switched off (dark level measurement). Second, the sensor value is read while the luminaire is turned on to its task level (bright level measurement). Third, the difference between bright and dark level measurements is computed. This difference will be used as the reference set-point.

That is, the reference represents the range over which the artificial light output from the lighting device(s) 102 can vary, with the effect of any current ambient light removed. So if the presence detection logic 302 indicates that it requires a certain level, say 80%, the calibration logic 304 translates this into a set-point value that is 0.8 times the reference value. Thus if there is no ambient light in the space 2, the light regulation logic 306 will dim the lighting device 102 to a level that achieves 80% of the light sensor value that would be read if the lighting device was turned on full. If there is some ambient light in the space 2 on the other hand, the light regulation logic 306 will act to reduce the light output of the device 102 so that the total light achieves the same sensor reading. I.e. the control loop acts to reducing the light output of the lighting device 2102 until the light sensor reading, resulting from the ambient and artificial light, is the same as if there was no ambient light and the lighting devices was emitting at 80%. Thus the total light is kept steady at the desired level as the amount of ambient light varies over time, e.g. as the amount of daylight entering through the window(s) 108 varies throughout the day.

In order to minimize the measurement error, for example due to changes in external light or due to people walking in the space, the time interval between dark and bright level measurements should preferably be as short as possible. Also, it may be preferable to perform the calibration simultaneously for all luminaires 101 in a group to assure that the calibration also takes into account the contribution of neighboring luminaires, since these are also involved in reaching the desired light level. There should preferably be enough time available for both controlling (multiple) luminaires and for proper light level measurement. Furthermore, the bright level should preferably be taken as high as possible, in order to minimize accumulated measurement and quantization errors. However, using very high bright levels might cause unwanted impact on user experience. The details of an exemplary calibration mechanism are discussed below.

In accordance with embodiments disclosed herein, the calibration logic 304 of a luminaire 101 is arranged to receive a trigger from the presence detection logic 302, and thereby be triggered to perform the calibration upon the positive presence result being detected via the respective presence sensor 111. The trigger may be implicit in the signal indicating the set-point (e.g. the calibration logic 304 knows that if the presence logic 304 is asking for task level or a certain level like 80% then presence has been detected), or alternatively the trigger may be a separate trigger signal.

Further, in embodiments, the calibration of a luminaire 101 need not only be triggered by its own local presence detection, i.e. not only by presence detected via its own response presence sensor 111. Alternatively or additionally, a luminaire 101 may be equipped to receive an indication of presence detected elsewhere by another luminaire, via the respective presence sensor of that other luminaire. Preferably each luminaire 101 in a distributed system is configured to be able to communicate with one or more others of the luminaires 101 in that system, and the presence detection logic 302 is configured to detect presence based on its own local detection and a detection from another luminaire 101 elsewhere.

Preferably the luminaires are configured to communicate wirelessly. In embodiments this may be achieved using one or more of the existing transducers 102, 110 or 111. For example the luminaires 101 may communicate using coded light, whereby a signal is embedded into the light emitted from the lighting device 102 by modulating the light at an imperceptible frequency, which can be received via the light sensor 110 on another luminaire 101. In another example, data may be embedded in the ultrasound pulses emitted by the presence sensors 111. Alternatively the luminaires 101 could be equipped with a separate type of transceiver for communicating with one another, e.g. an RF transceiver or a wired interconnect.

By whatever medium is used, the presence detection logic 302 may be configured to emit message indicating presence whenever it detects presence at its own, local presence sensor 111. This indication will be received by the respective presence detection logic 302 on one or more other, neighboring luminaires 101 within a certain range. The presence detection logic 302 on each luminaire 101 may be configured to set the light to a one operative level if it detects presence via its own local presence sensor 111, and to another, lesser operative level if it detects presence from elsewhere via one of the indications from another luminaire 101. The greater operative level triggered by local presence may be referred to as the task level, and the lesser operative level triggered by presence elsewhere may be referred to as the background level. For example the task level may be 80% or 88% or some other value in the range 70%-90%. The background level may for example be 20% or some other value in the range 10%-30%.

Further, the presence detection logic 302 on each luminaire 101 may be configured to trigger calibration if presence is detected via its own local presence sensor 111, and to trigger calibration if presence is detected via one of the indications of presence being detected at one of the other luminaires 101 elsewhere. That is, the condition for triggering calibration is that either of a local presence or a presence elsewhere is detected. If local presence is detected, that will trigger calibration; and of presence elsewhere is detected, that will also independently trigger calibration.

In embodiments, the controller 112 implemented in each luminaire 101 may be configured to trigger and perform the calibration in line with the following.

To perform the calibration simultaneously for a multiple luminaires 101 in a group, this requires a common trigger for all the luminaires in the group. For this, embodiments use the first presence trigger in a vacant state (local found) for the luminaire 101 that has detected presence, and elsewhere found for all other luminaires in the group).

For the calibration process two light measurements are involved: a first before turning on the lights (dark level measurement) and a second after setting all the lights in a group to the calibration level (bright level measurement). The calibration level can in principle be any light level, since the calibrated reference set-point (corresponding to maximum light level) can be calculated from a first level that is above zero and/or a second level that is less than maximal by using a scale factor (assuming that the relation between the dim level and the light level is known or linear). It is however advised to perform the calibration at a light level that is as high as possible (task level or maximum level) to maximum accuracy.

All luminaires 101 in a group shall be turned off while performing dark level measurement. Bright level measurement shall be done while all luminaires in a group are switched on and dimmed to the calibration level.

Figure 5:
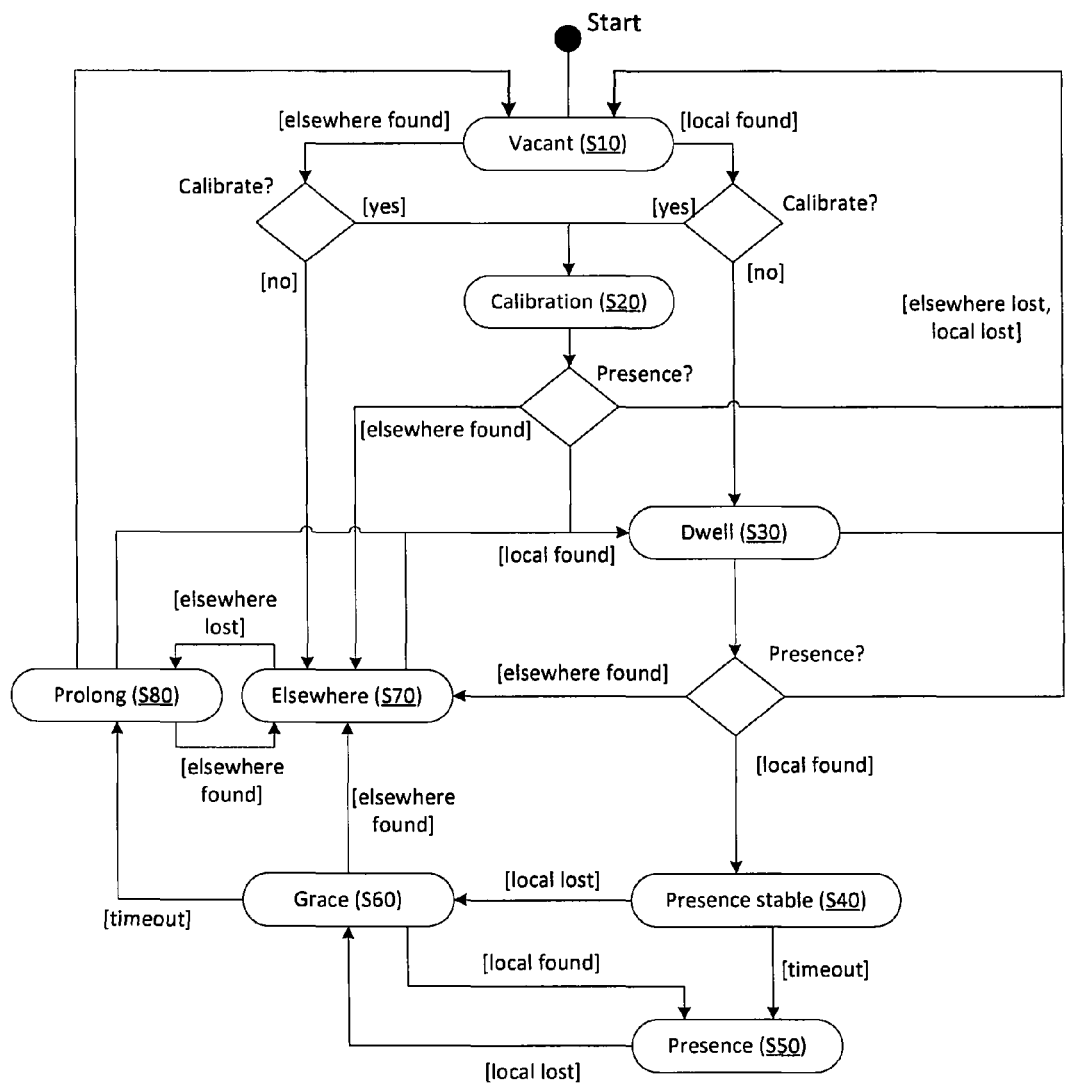
FIG. 5 is a schematic state diagram of a luminaire having calibration and presence detection states.

A state diagram for the controller 112 of each luminaire 101 is presented in FIG. 5. The possible states the controller 112 can take comprise: a "Vacant" state (S10), a "Calibration" state (S20), a "Dwell" state (S30), a "Presence Stable" state (S40), a "Presence" state (S50), a "Grace" state (S60), an "Elsewhere" state (S70), and a "Prolong" state (S70).

The (automatic) calibration will be triggered in a Vacant state (S10) by receiving either "local found" or "elsewhere found" messages. A new state "Calibration" (S20) is introduced in the state machine. The state machine enters Calibration state (S20) solely from the Vacant state (S10) once receiving either local found or elsewhere found trigger and once calibration criteria are met. The calibration criteria may be time based and configurable. For example calibration may be performed daily or multiple times a day, preferably with frequency less than every 2 hours. Once calibration is complete, the state machine should perform transition into an eventual state, being either Dwell (S30) or Elsewhere (S40).

Since dark level measurement will be done while all the luminaires are switched off, doing so after presence is detected would cause additional latency between presence detection and turning lights on, and therefore impact user experience. In order to avoid this effect, it is preferable to keep measuring the dark level while in the Vacant state (S10). Furthermore, the measurements may be filtered in order to reduce local measurement errors.

As stated above, the measurements may be done once all luminaires in a group are set to the same preset level, being off and task level respectively. Therefore it may be desirable to manage processing timing appropriately. The timing aspects of the calibration are illustrated in FIG. 4, which illustrates timing on an example consisting of three luminaires.

Figure 4:
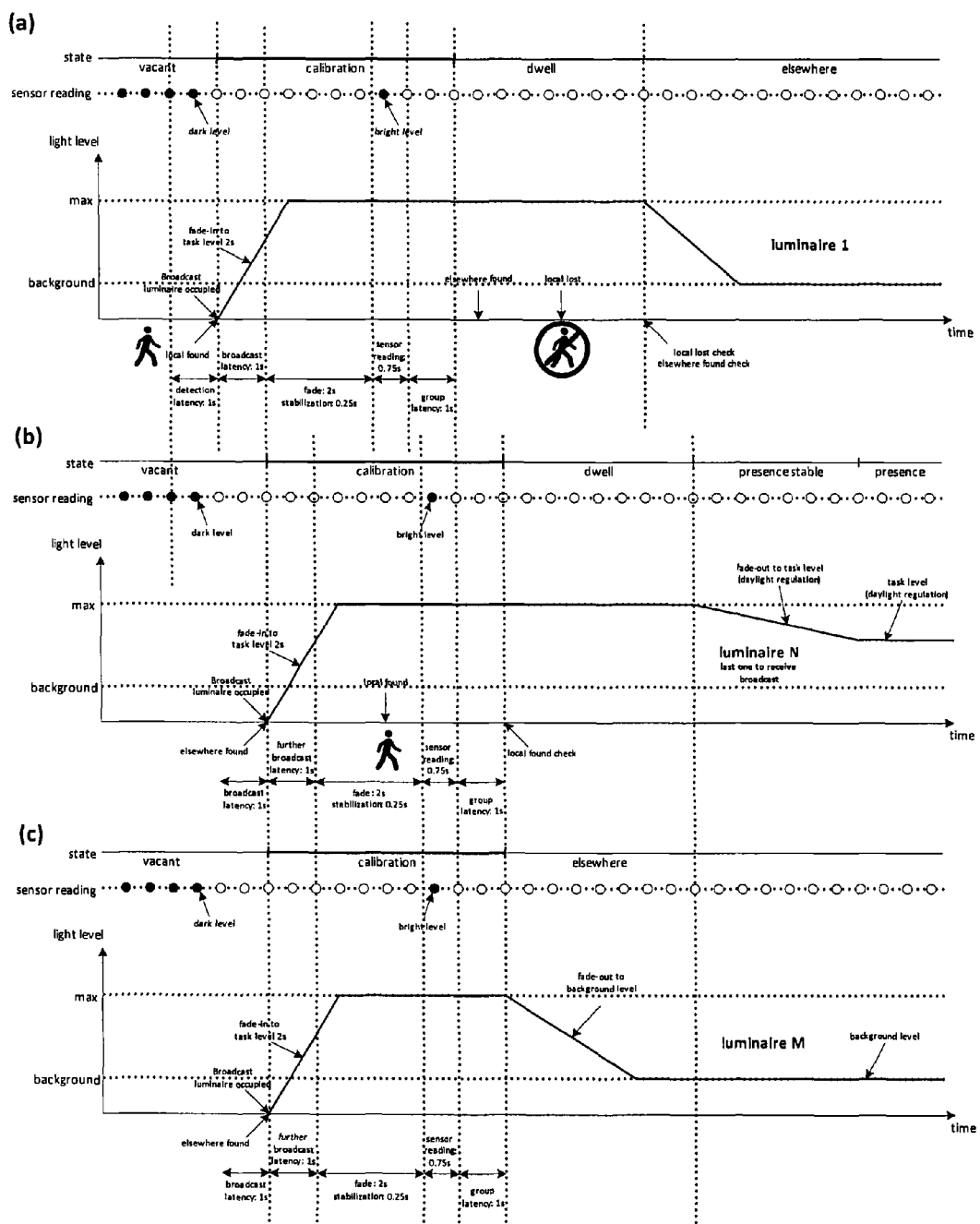
FIG. 4 is a schematic timing diagram showing light levels of luminaires during a calibration process.

FIG. 4(*a*): Luminaire 1 receives presence detection trigger from its local sensor (local found), however this presence is lost once dwell time elapses. For example this may be a luminaire placed close to the entrance to an open plan office.

FIG. 4(*b*): Luminaire N does not initially detect presence locally, but receives a presence detection trigger via a broadcast message ("elsewhere found"). However, this subsequently changes to local presence ("local found") once in the calibration state (S10). I.e. presence is detected locally soon after it is detected via the message from the first Luminaire 1. For example this may be a luminaire located at a workplace, further away from the entrance.

FIG. 4(*c*): Luminaire M receives presence a detection trigger via a broadcast message ("elsewhere found") and it doesn't change during calibration, i.e. unlike Luminaire N does not detect presence locally after beginning calibration. For example this could be a luminaire place by an unoccupied workplace.

A luminaire is able to compute dark level based on past readings prior to presence detection. Dark level measurement may be performed repeatedly while remaining in the vacant state. The last read values may be kept in a buffer. This will allow for minimizing time needed to complete the calibration once the state changes. The number of values stored in a buffer (e.g. 10) may be compile-time configurable. The light level samples taken into account are marked dark in FIG. 4. Once in the buffer, the samples may be filtered. For example the filtering may based on the following algorithm:

Take n samples from a buffer, where n is configurable in the software.

Find m highest and m lowest samples and discard them. The value of m may be configurable in the software. Note that m will be considerably lower than n/2.

Compute a statistical mean value of the remaining samples.

All the readings prior to the local presence detection can be used. However, in case of elsewhere presence detection, the most recent readings prior to receiving presence detection broadcast message are preferably ignored (e.g. 1-3 sec prior in FIG. 4, or at least more than the broadcast delay plus margin). This in order to avoid reading levels that might be affected by other luminaires already fading in. For the sake of implementation a constant number of dark samples might be ignored regardless of local found or elsewhere found trigger being received.

Eventually, the light fades in to the calibration level (presumably maximum light level). It may be presumed that fade-in time might take up to 2 seconds (fast fade since it is the first light that the occupant sees, and in order to minimize the time between measurements in the calibration). Thereafter, luminaires preferably wait for other luminaires to fade-in and stabilize the light output. The wait time shall preferably not be less than 3.25 s (1 s for broadcast, 2 s for fade-in and 0.25 s for light output stabilization). It is proposed to use a default wait time of 5 seconds.

After the light output is set to the calibration level, and after a wait time allowing other luminaires to be set accordingly elapses, the bright level measurement is performed. The sensor reading process introduces additional latency of 0.75 s. Since bright level measurement is less sensitive for errors, a single reading may be considered sufficient. Multiple readings can be considered, however these would introduce additional latency.

Once both dark and bright levels are read and available, the calibrated reference set-point cp can be computed as follows:

$$cp = (s_{bright} - s_{dark})/\dim_{cal}$$

where: $s_{bright}$ is the bright level reading, $s_{dark}$ is the dark level reading, and $\dim_{cal}$ is the dim level used for bright level reading for calibration (e.g. 1.0 or task level, e.g. 0.8).

The calibrated set-point may be filtered in order to avoid incidental measurement errors. A similar filter may be used as the one for filtering dark measurements (see the description above). Also in this case, buffer length n and the number of extreme values to be discarded m may be configurable in the software. It may be preferable to store actual computed values in the buffer and not the one resulting from filtering. Preferably the calibrated set-point value history is kept in a persistent memory. In a freshly installed luminaire the calibrated set-point history is not available. Therefore the buffer values may be reset to a default invalid value (e.g. 0) in a factory. Once processed for a first time, the whole buffer can be filled with the actual calibrated set-point resulting from the first measurements.

After completing bright level reading, each luminaire waits another second in order to make sure all the luminaires were able to complete their measurements. The luminaires continue state transitions to either Dwell (S30) or Elsewhere (S70) states, as appropriate.

The luminaire 1 switches to the Dwell state (S30). The Dwell time is reduced reflecting the time spent in the Calibration state (S20). It retains calibration light level in the Dwell state (S30). Once the Dwell state (S30) elapses, both local lost and elsewhere found triggers are considered resulting in transition to the Elsewhere state (S70) and a graceful light level transition to the background level.

The luminaire N receives local found trigger once in Calibration state (S20). Therefore, the state switches to Dwell (S30). Similarly to the luminaire 1, the Dwell time is reduced reflecting the time spent in the Calibration state (S20) and the calibration light level is kept. Once the Dwell time elapses, the state changes to Presence stable (S40) and eventually the Presence state (S50). The daylight regulation is activated in these states, resulting in dynamic light level adjustments.

The luminaire M does not receive any further messages next to the elsewhere found. Therefore, once completing calibration, the state changes to Elsewhere (S70) immediately, resulting in a graceful fade-out to the background level.

In embodiments, to implement the off-on transition, it may be preferable that there is little or no delay in the light source reaching its full light output, e.g. like with fluorescent lamps. This is not an issue for LED based lights (instant on).

Also, when powering up the system, it may be preferable to delay the light output to make sure that the light sensor has sufficient time to measure the light level at the off state. This time can be low (e.g. 200 ms).

It will be appreciated the above embodiments have been described only by way of example.

For instance, sensing presence is not limited to sensing motion, nor sensing a human. Generally presence sensing techniques are available for sensing either the motion or the existence of any being (whether human or other living creature), or other animate or inanimate object. Further, the teachings above to not have to be limited to any one particular sensing technology like ultrasound sensing or infrared sensing, but could be extended to any active or passive sensing technique.

Figure 2:
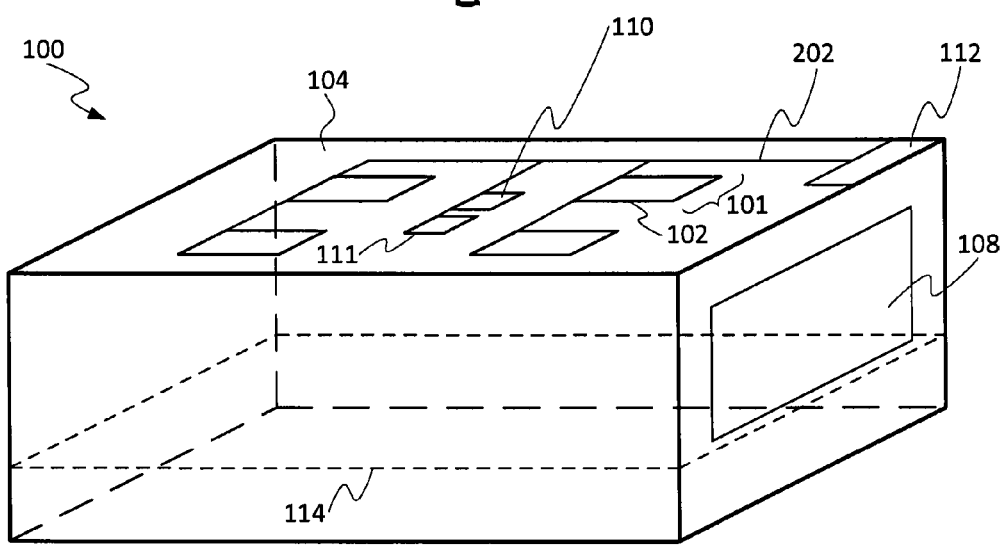
FIG. 2 is a schematic illustration of an environment comprising another lighting system.

The above has been described in relation to a distributed system as illustrated in FIG. 1. However in an alternative arrangement shown in FIG. 2, instead of each luminaire 101 comprising its own respective controller 112, a common controller 112 may be coupled to one or more lighting devices 102 for controlling light level in the room or other space 100. Alternatively or additionally, instead of each luminaire 101 comprising its own respective light sensor 110, one or more common light sensors 110 may also be provided in the space 100, e.g. mounted to the ceiling 104 but not necessarily co-located with any of the lighting devices 102. Alternatively or additionally, instead of each luminaire 101 comprising its own presence sensor 111 integrated or co-located with the respective lighting device 102, there may instead be provided one or more common presence sensors 111. The separate light sensor(s) 110, presence sensor(s) 111, controller(s) 112 and lighting devices 102 may be coupled to the controller via a wired interconnect 202 or wirelessly. For example the light sensor(s) 110 and/or presence sensor(s) 111 may be equipped with a wireless transmitter for sending signals of sensed light levels and/or presence to one or more of the luminaires 101 or controller 112.

In these kinds of arrangements, the centralized controller 112 may be configured to regulate the lighting based on the common light sensor(s), to perform the calibration based on readings from the common light sensor(s), and/or to trigger the calibration in response to presence as detected by the common presence sensor(s) 111.

Figure 2A:
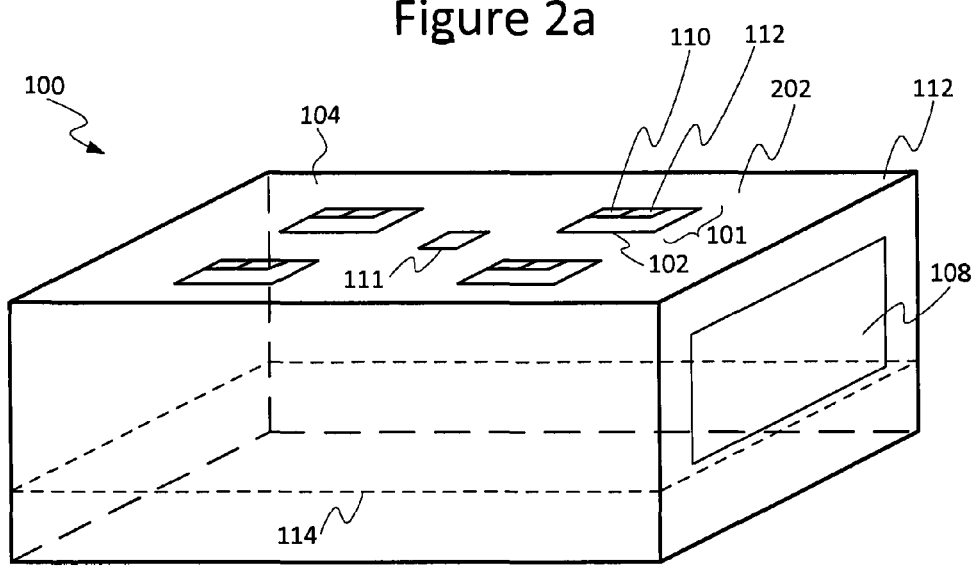
FIG. 2a is a schematic illustration of an environment comprising yet another lighting system.

In another variant as illustrated in FIG. 2a, each luminaire 101 comprises its own controller 112 and light sensor 110 but the presence sensor 111 is not part of the luminaire 101 or controller 112. E.g. each of a plurality of luminaires 101 may shares one or more common presence sensor(s) 111. In such cases the presence sensor 111 will signal an indication of presence to one or more luminaires 101, e.g. by RF or other wireless or wired communication. The respective controller 112 on one or more luminaires 101 receives this indication from the separate presence sensor and in response triggers the calibration of its respective light sensor 110 to be performed at that luminaire 101, as well as triggering the lights to be turned up to the operative level in response to the indication from the separate presence sensor.

In yet further embodiments, the presence-triggered calibration disclosed herein may be used in relation to a single stand-alone luminaire. For certain applications these arrangements may be less preferred than the distributed case of FIG. 1. However, the centrally controlled case of FIG. 2 or the single stand-alone case are not necessarily excluded for all possible embodiments.

Where it is said above that a value is within a limit or threshold (or the like), this covers the options of either a "less than" type operation or a "less than or equal" to type operation. Similarly, if it is said that a value is beyond or exceeds a limit or threshold (or the like), this covers the options of either a "more than" or a "more than or equal to" type operation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller comprising:
an input for receiving a reading from a light sensor representing a sensed light level;
presence detection logic for detecting presence based on a presence sensor, and configured to indicate a set-point to bring at least one lighting device to an operative level in response to a positive detection of presence; and
calibration logic for performing a calibration operation, by causing a light output of the lighting device to change between a first, lower level and a second, higher level, and calibrating the set-point based on the reading from the light sensor under influence of the first and second levels;
wherein the calibration logic is configured to trigger the calibration operation to be performed in response to said positive detection of presence.

2. The controller of claim 1, wherein:
the sensed light level comprises a contribution from the at least one lighting device and a contribution due to ambient light; and
the controller comprises light regulation logic configured to operate the lighting device based on said set-point and the reading from the light sensor, thereby acting to maintain the sensor reading at a level corresponding to the set-point while a relative proportion of said contributions varies.

3. The controller of claim 1, wherein the calibration logic is configured to trigger the calibration operation to be performed before the lighting device is brought to said operative level.

4. The controller of claim 1, wherein the reading from the light sensor under influence of the first level, but not the second level, has already been taken upon triggering the calibration operation.

5. The controller of claim 1, wherein the calibration logic is configured to calibrate the set-point based on a difference between the reading from the light sensor for the first and second levels.

6. The controller of claim 5, wherein the calibration logic is configured to calibrate the set-point by representing a set-point signal relative to said difference.

7. A first luminaire comprising the controller of claim 1, and also comprising the lighting device, light sensor and presence sensor;
wherein the presence detection logic is configured to detect presence including said positive detection of presence based on the first luminaire's own presence sensor, and to transmit an indication of the positive presence result to one or more other luminaires for triggering a respective calibration operation to be performed at each of the one or more other luminaires.

8. The first luminaire of claim 7, wherein the calibration operation or operations are performed by the luminaires and the indication or indications are transmitted between the luminaires without a central controller.

9. A first luminaire comprising the controller of claim 1, and also comprising the lighting device and light sensor, for use with another luminaire comprising said presence sensor;
wherein the presence detection logic is configured to detect presence including said positive detection of presence based on an indication of presence derived from the presence sensor on the other luminaire and transmitted from the other luminaire, the calibration operation being triggered by the positive presence result as indicated from the other luminaire.

10. A first luminaire comprising the controller of claim 1, also comprising the lighting device, light sensor and presence sensor, and being for use with one or more other luminaires each comprising a respective other presence sensor;
wherein the presence detection logic is configured to detect presence based on the first luminaire's own presence sensor, and on indications of presence transmitted from the one or more other luminaires derived from the respective other presence sensors; and
the calibration logic is configured to trigger an instance of the calibration operation if a positive detection of presence is detected based on the first luminaire's own presence sensor, and to trigger an instance of the calibration operation if a positive detection of presence is detected based on one of the indications transmitted from one of the other presence sensors.

11. The first luminaire of claim 10, wherein the presence detection logic is configured to bring the lighting device to a lower operative level in response to the indication of presence transmitted from the other luminaire, and to a higher operative level in response to the positive detection of presence detected based on the luminaire's own presence sensor.

12. The controller of claim 1, wherein the presence sensor is implemented in a separate unit than the controller and lighting device, and transmits an indication of presence to the controller; and
the presence detection logic is configured to detect presence including said positive detection of presence based on the indication transmitted from the presence sensor, the calibration operation being triggered by the positive presence result as indicated by the transmission from the presence sensor.

13. The controller, first luminaire or lighting system of claim 1, wherein a power supply to said controller, first luminaire or lighting system is already turned on upon triggering the calibration operation.

14. A lighting system comprising a plurality of luminaires, each respective one of the luminaires comprising a respective controller, light sensor and presence sensor, and the controllers being configured to perform operations of:
detecting presence events at each of the respective luminaires based on the respective presence sensor;
transmitting indications of the presence events between the luminaires;

operating the luminaires to emit light in dependence on the presence events; and performing a respective calibration operation to calibrate each of the luminaires, by causing a light output of the respective luminaire to change between a first, lower level and a second, higher level, and taking a reading from the respective light sensor under influence of the first and second levels;

wherein each of the respective controllers is operable to trigger the respective calibration operation in response to one of the presence events detected at the respective luminaire, and is operable to trigger the respective calibration operation in response to one of the indications of presence events being received from one or more other of the luminaires;

such that one of the presence events detected at a first of the luminaires triggers the respective calibration operations of the first luminaire and one or more of the other luminaires, the respective calibration operations thereby being triggered to be performed at least partially in parallel with one another.

15. A computer program product for use in controlling at least one lighting device, the computer program product comprising code embodied on a non-transitory computer readable storage medium and configured so as when executed to perform operations of:

receiving a reading from a light sensor representing a sensed light level;

detecting presence based on a presence sensor;

indicating a set-point to bring at least one lighting device to an operative level in response to a positive detection of presence; and triggering a calibration operation to be performed in response to said positive detection of presence, wherein the calibration operation comprises causing a light output of the lighting device to change between a first, lower level and a second, higher level, and calibrating the set-point based on the reading from the light sensor under influence of the first and second levels.

* * * * *